United States Patent [19]
Todd et al.

[11] Patent Number: 5,185,509
[45] Date of Patent: Feb. 9, 1993

[54] ROBOTIC ARM TOOL MOUNTING APPARATUS

[75] Inventors: Thomas Todd; Todd B. Skinner, both of San Diego, Calif.

[73] Assignee: Toddco General, Inc., San Diego, Calif.

[21] Appl. No.: 657,564

[22] Filed: Feb. 19, 1991

[51] Int. Cl.⁵ .............................................. B23K 3/03
[52] U.S. Cl. .................................................. 219/85.16
[58] Field of Search ............... 219/85.16, 85.18, 85.19, 219/85.21, 233; 228/180.2, 5.5, 44.7; 901/42

[56] References Cited

U.S. PATENT DOCUMENTS

| | | | |
|---|---|---|---|
| 4,025,750 | 5/1977 | Keizer et al. | 219/85.18 |
| 4,605,833 | 8/1986 | Lindberg | 219/85.18 |
| 4,875,614 | 10/1989 | Cipolla et al. | 228/5.5 |
| 4,894,506 | 1/1990 | Woerner | 219/85.16 |
| 4,982,890 | 1/1991 | Schuster et al. | 228/44.7 |
| 5,051,555 | 9/1991 | Porterfield et al. | 219/85.16 |
| 5,068,508 | 11/1991 | Phalon, Jr. et al. | 219/85.16 |

*Primary Examiner*—Geoffrey S. Evans
*Attorney, Agent, or Firm*—Bernard L. Kleinke; Jerry R. Potts; William Patrick Waters

[57] ABSTRACT

A robotic controlled soldering apparatus is more precise in operation apparatus, and includes a protuberance and complementary shaped socket for defining a universal joint to provide a gimballing action to help prevent unwanted shift in the robotic control unit. A supply of fluid under pressure is directed between the pertuberance and the socket to reduce friction between their respective surfaces to reduce reaction on the delicate robotic arm as the head settles in place.

15 Claims, 4 Drawing Sheets

ROBOTIC ARM TOOL MOUNTING APPARATUS

DESCRIPTION

Cross-Reference to Related Applications

Copending U.S. patent application, entitled "ROBOTIC TOOL ADAPTOR APPARATUS AND METHOD OF USING SAME," filed concurrently herewith on Feb. 19, 1991, assigned Ser. No. 07/657,563 is hereby incorporated by reference as if fully set forth herein.

TECHNICAL FIELD

This invention relates in general to a robotic arm tool mounting apparatus and a method of using same. It more particularly relates to a such an apparatus for facilitating in a more accurate manner, robotic arm operations, such as soldering operations for integrated circuit devices.

BACKGROUND ART

There have been many different types and kinds of mass production techniques for assembling electronic devices, such as integrated circuit devices, to a printed circuit board. One such technique is a heated bar reflow soldering system. In this system, an electronic device or component to be installed is 1) retrieved from a lead die machine by a pick and place unit; 2) transported to a location in close proximity to a device placement site; 3) visualized and aligned so the leads of the device can be accurately placed on the pads of the printed circuit board; 4) placed on the pads of the printed circuit board; and 5) secured to the printed circuit board pads by applying heat to solder pre-deposited on the pads.

Such a hot bar reflow soldering system typically employs a robotic system including a robotic arm for moving selectively the electronic component relative to the printed circuit board. A soldering head mounted on the end of the robotic arm may include a pick and place unit for holding and carrying the electronic component for placement on a soldering site, such as the pads of a printed circuit board. The head also includes a soldering arrangement including a reflow soldering hot bar unit, for soldering the leads of the component to the pads of a printed circuit board.

An important aspect in a reflow soldering system is the accurate placement and soldering of the leads of a device to the pad of the circuit board to establish proper solder connections for electrical continuity. In this regard, if the closely spaced leads of an electronic component are not each properly aligned relative to the corresponding pads on the printed circuit board, improper solder connections can result. Thus, costly and unwanted rejects of the assembled circuit board, can occur.

While such prior known systems have been generally satisfactory for standard pitch electronic devices, new assembly problems are being encountered with the increasing use of fine pitch electronic devices. In this regard, there has been increased potential for misalignment between the leads of a fine pitch device and the pads of a corresponding substrate site, such as a printed circuit board. More particularly, potential misalignment problems can develop from three sources: (1) handling of the device prior to placement on the printed circuit board; (2) non-coplanarity between the device leads and the substrate site during placement; and (3) movement induced by the reflow process itself. Therefore it would be highly desirable for any robotic hot bar soldering system utilized in fine pitch surface mount technology to greatly reduce, if not eliminate entirely, such misalignment between the leads of a fine pitch integrated circuit device and the pads of a corresponding printed circuit board.

Integrated reflow hot bar soldering heads are well known in the prior art. However, prior art systems utilized for the placement and assembly of fine pitch devices to printed circuit board substrates have proven less than totally satisfactory in that they have not successfully reduced or substantially eliminated non-coplanarity problems between the leads of the device and the substrate surface.

One attempted solution at solving the aforementioned non-coplanarity problem has been the direct pressure method. In this regard, in order to solve the non-coplanarity problem, the soldering elements of the hot bar soldering head are brought into direct contact with the leads of the electronic device to apply not only heat to the pads of the printed circuit board, but also to apply direct force to the leads of the device for maintaining lead alignment with the pads of the printed circuit board. While this attempted solution has proven satisfactory with standard pitch devices, the coupling of the hot bar tool to a robotic control source has induced other problems with reference to fine pitch devices.

For example, conventional large scale fine pitch devices are generally rectangular in shape with groups of fine pitch leads extending from all four sides of the body of the device. For soldering purposes, this type of fine pitch device configuration requires a hot bar head with a set of hot bars configured in a generally rectangular configuration for engaging simultaneously all the leads of the electronic device. In this regard, an operator of the robotic control unit is able to visually align the leads of the electronic device by adjusting their orientation relative to the pads of the printed circuit board. Such adjustments are in coplanar X,Y directions and rotatively in a $\theta(z)$ direction perpendicular to the X,Y planes.

However, coplanar adjustments for maintaining a parallel relationship between the electronic device and the substrate surface of the printed circuit board are difficult, if not entirely impossible to be made because of the difficulty in visualizing the parallel relationship between the leads and the pads of the printed circuit board. Thus, if any coplanarity problem exists, the pads of the printed circuit board do not tend to be engaged simultaneously with all of the leads of the electronic device. As a result of noncoplanarity between the pads and the leads, various forces are directed against the reflow solder head and the robotic arm supporting the head. The effects produced by such forces depends on the position of the line of action of the impact force and the resulting translational forces induced as the head continues to downward path of travel. Moreover particularly, the translational forces can cause either the robotic unit or the printed circuit board to move. The movement of either one can result in misalignments between leads and pads.

Moreover, once the leads of the electronic device are engaged with the pads, further misalignment problems can also develop as heat is applied to the solder pre-deposited on the printed circuit board pads. In this regard, depending on the thermal mass of the leads, pads and solder, the solder on the pads may liquify non-uniformly and unevenly. Thus, for example, if the solder liquifies on one side of the board as opposed to the other, the soldering head will sink downwardly into the liquified solder but will also remain stationary against the solid solder. Thus, as the one side sinks into the solder during the solder reflow process, non-coplanarity will again induce rotative forces against the head, causing the robotic unit and head to rotate, resulting in, for example, lead to pad misalignment, unsoldered connections, or improper solder connections.

Therefore it would be highly desirable to have a new and improved robotic arm tool apparatus and method of using to provide a highly precise and accurate mode of operation. Such an apparatus and method should reduce, if not eliminate entirely, lead to pad misalignments caused by non-coplanarity problems between the leads of an electronics device and the pads of a corresponding printed circuit board.

DISCLOSURE OF INVENTION

Therefore the principal object of the present invention is to provide a hot bar soldering system and head and method for accurately placing the leads of a fine pitch device in alignment with the pads of a corresponding printed circuit board, and for accurately soldering the fine pitch leads to the pads of the printed circuit board without the introduction of any substantial misalignment or improper soldered connections.

Another object of the present invention is to provide such a new and improved system and head which is relatively simple in construction and very convenient to use, and which can be manufactured at a relatively low cost.

SUMMARY OF THE INVENTION

Briefly, the above and further objects of the present invention are realized in accordance with the present invention by providing an integrated soldering head having a truncated semi-spherical shaped protuberance and complementary shaped socket. The protuberance and socket define a universal joint to provide a gimballing action relative to the center point of an operative piece such as a printed circuit board. A supply of fluid under pressure is directed between the protuberance and the socket to reduce friction between their respective surfaces to reduce reaction on the delicate robotic arm as the head settles in place. Any unwanted axial x-y shift by the robotic unit for complying with a non-coplanar printed circuit board is prevented during placement of an electronic device on a corresponding printed circuit board as well as during the reflow soldering process. The method of preventing lead to pad misalignment includes the steps of using a robotic unit and integrated hot bar soldering head for movement and soldering purposes, causing the robotic unit to move the integrated hot bar soldering head into contact with a fine pitch electronic device.

Holding the electronic device in a firm stationary manner while simultaneously applying a downwardly directed force on the leads of the fine pitch device to cause the leads to come into engagement with a set of corresponding pads disposed on a printed circuit board. Complying with any non-coplanarity between the printed circuit board and the leads of the fine pitch device by pivoting the head independently of the robotic unit and about a center point disposed on the printed circuit board surface in alignment with the geometric center of the electronic device being placed thereon. By pivoting about this center point, x-y axial shifts of the robotic unit are reduced, if not eliminated substantially. Applying heat to solder pre-deposited on the pads of the printed circuit board for liquefying the solder; and maintaining proper tolerance control between the pads and leads for forming proper soldered connections during the reflow process by again pivoting the head independently of the robotic unit and about the same center point on the printed circuit board to prevent x-y axial shifts of the robotic unit.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 3 is a greatly enlarged, partially diagrammatic longitudinal sectional view of the hot bar reflow soldering head taken along the line 3—3 of FIG. 2a;

BEST MODE FOR CARRYING OUT THE INVENTION

Figure 1:
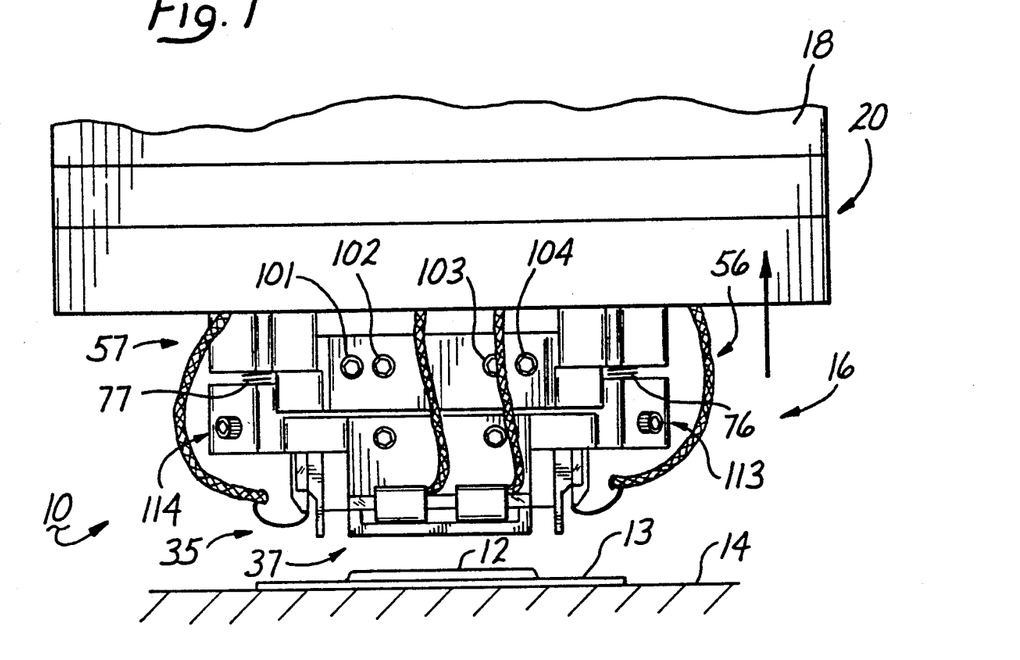
FIG. 1 is a partly fragmentary pictorial view of a hot bar reflow soldering system, including a hot bar reflow soldering head, which system and head are each constructed in accordance with the present invention, and which is shown operatively associated with a printed circuit board assembly and a robotic control unit shown fragmentarily, for illustrative purposes.
Figure 3:
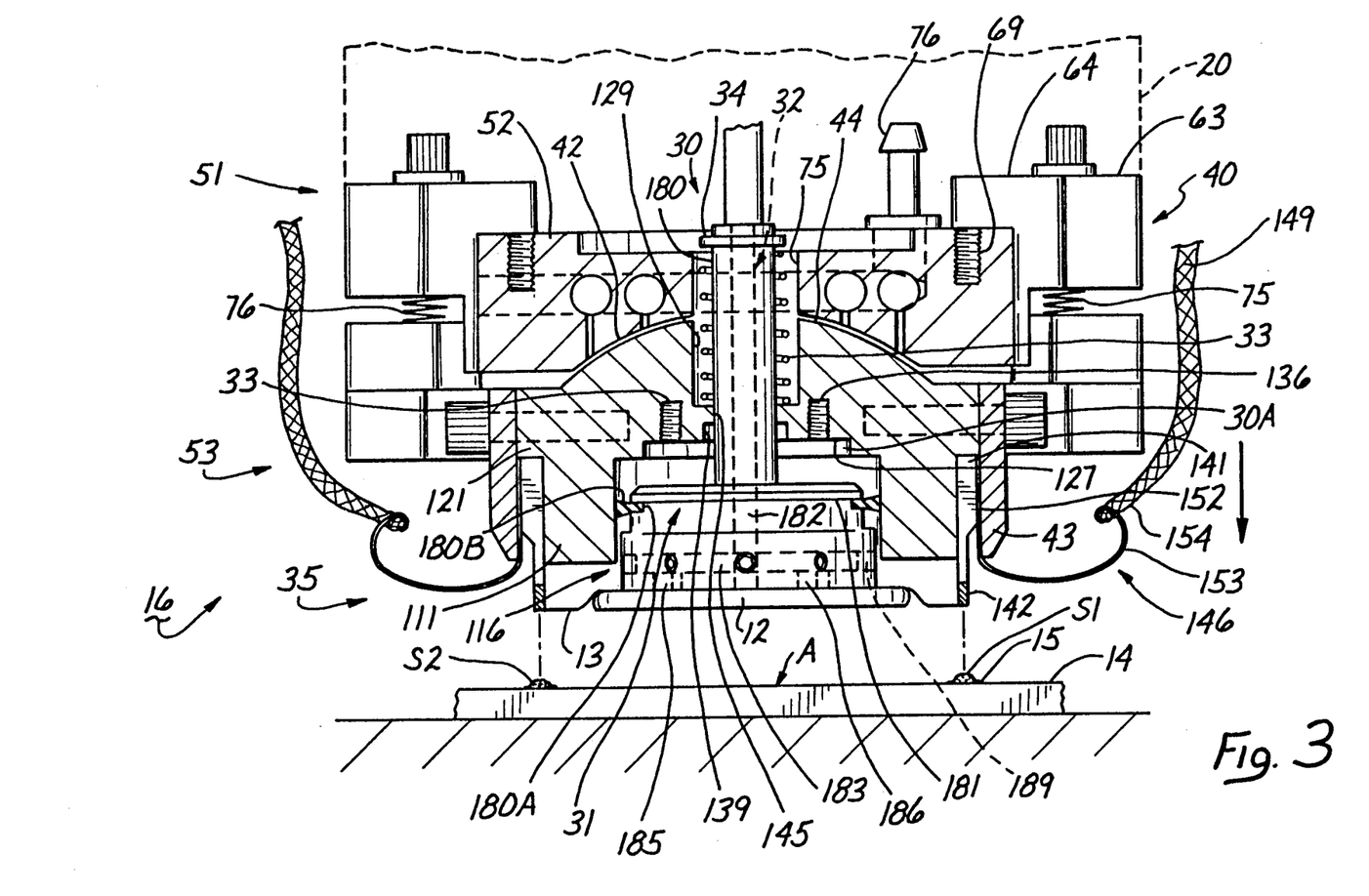

Referring now to the drawings, and more particularly to FIG. 1, there is shown a hot bar reflow soldering system 10 which is constructed in accordance with the present invention. The system 10 of the present invention enables a fine pitch circuit component, such as an integrated circuit device 12, to be positioned more accurately on a printed circuit board, such as a printed circuit board 14, by eliminating, or at least greatly reducing, misalignments associated with non-coplanarity problems between the leads of the circuit device, shown generally at 13, and the pads on the printed circuit board, shown generally at 15 (FIG. 3). The hot bar reflow soldering system 10 includes an integrated reflow soldering head assembly 16 which is adapted to be attached removably to a robotic unit 18 through a robotic tool adaptor 20, each forming part of the soldering system 10. The robotic unit 18 and the robotic tool adaptor 20 are more fully described in the above mentioned copending U.S. patent application Ser. No. 07/657,563. For the purpose of holding the circuit device 12 in a firm stationary manner for placement on and soldering to the printed circuit board 14, the reflow soldering head assembly 16 also includes a holding unit 30 and a soldering unit 35 respectively.

As will be explained hereinafter in greater detail, the reflow soldering head assembly 16 is an over-center device adapted to couple the downwardly directed forces of the robotic unit 18 in an evenly distributed manner to the leads 13 of the circuit device 12. By evenly distributing the applied robotic forces, the leads 13 of the circuit device 12 can engage the pads of the printed circuit board 14 without introducing any substantial lead to pad misalignment due to printed circuit board non-coplanarity problems. In this regard, the reflow soldering head assembly 16 also includes an air activated gimballed joint, shown generally at 40, (FIG. 3) for reducing, if not eliminating entirely, unwanted and undesired x-y axial shifts in the robotic unit 18 for complying with a non-coplanar printed circuit board. The gimballed joint 40 enables the soldering unit 35 to move in a pivoting rockable manner for maintaining proper tolerance control without the need for x-y axial shifts in the robotic unit 18. Thus, bonding of the leads 13 to the pads 15 of the printed circuit board 14 can be achieved in a more reliable and accurate manner.

In operation, the robotic unit 18 causes the holding unit 30 (FIG. 3) of the reflow soldering head assembly 16 to firmly secure a circuit device, such as device 12, for transportation to a printed circuit board, such as board 15. After the leads 13 of the circuit device 12 have been initially aligned with the pads 15 of the printed circuit board 14, by moving the robotic unit 18, the robotic unit 18 causes the circuit device 12 to be moved rectilinearly downwardly into engagement with the printed circuit board 12. Assuming the printed circuit board 14 is not coplanar with the leads 13 of the circuit device 12, the leads of the device 12 will initially come into engagement with their corresponding sets of pads in an uneven or non-parallel manner. The resulting forces directed against the leads 13 via the downward travel of the robotic unit 18 will cause the soldering unit 35 to pivot rockably about its longitudinal center relative to the gimballed joint 40 to comply with the non-coplanarity of the board. This gimballed action occurs relative to a center point, such as a center point shown generally at A (FIG. 3) disposed on the printed circuit board surface in alignment with the geometric center of the body portion of the electronic device being placed on the board 14. Thus, the soldering head assembly 16 is able to pivot about the center of the circuit device 12 and independently of the robotic unit 18, thereby eliminating any x-y axial shifts on the part of the robotic unit 18 because of non-coplanarity problems.

As the robotic unit 18 continues in its downward path of travel, corresponding pivotal adjustments are made by the soldering unit 35 until all of the leads of the circuit device 12 firmly engage the pads of the printed circuit board 14. The robotic unit 18 then causes the soldering unit 35 to heat the pads of the printed circuit board 14 to soldering temperatures so that solder predeposited solder shown generally at S1 and S2 on the pads 15 of the printed circuit board 14 will begin to reflow. As this reflow soldering process is executed, the robotic unit 18 continues to direct a downward force against the leads of the device 12 and the pads of the board 14, respectively. In this regard, should any given bead of solder, such as solder S1 reflow on one side of the board 14 as opposed to another bead, such as S2, the gimballed action of the joint 40 relative to robotic unit 18, permits the soldering unit 35 to adjust movably so that proper tolerance controls are maintained between the circuit leads relative to the pads of the printed circuit board.

Considering now the integrated reflow soldering head assembly 16 in greater detail with reference to FIGS. 1-5, the head assembly 16 includes an upper head section, shown generally at 51, and a lower head section shown generally at 53. The upper head section 51 and the lower head section 53 are mounted movably together to facilitate a rotative pivotal rocking motion. In this regard, the upper head section 51 is mounted fixedly to the robotic tool adapter 20 by means not shown, while the lower head section 53 is mounted movably relative to the upper head section 51.

For the purpose of helping to facilitate the rotative pivotal rocking movement of the lower head section 53 relative to the upper head section 51, the upper head section 51 includes a centrally disposed truncated semispherical recess or socket 42 that is dimensioned to receive a complementary shaped centrally disposed protuberance 44 extending upwardly from the upper surface of the lower head section 53. The socket 42 and protuberance 44 cooperate together to define the gimballed universal joint, shown generally at 40.

Considering now the upper head section 51 in greater detail with reference to FIGS. 1-5, the upper head section 51 generally has a unitary construction and is composed of a light weight metallic material, such as aluminum for helping to minimize the load carried or supported by the robotic unit 18. The upper head section 51 includes a flat rectangularly shaped body portion 52 and a set of four integrally connected outwardly projecting raised arms 55-58. The arms 55-58 are connected at the four corner portions 59-62 respectively of the body 52. As will be explained hereinafter in greater detail, the arms 55-58 are adapted to receive and support a corresponding set of spring assemblies, such as assemblies 65-68 respectively. In this regard, each spring assembly 65-68 includes a spring 75-78 respectively, mounted removably between the upper head section 51 and the lower head section 53 for helping to facilitate their relative movement and for suspending resiliently the lower head section 53 from the upper head section 51 in a movable manner. As the arms 55-58 are substantially identical and the spring assemblies 65-68 are substantially identical, only arm 55 and spring assembly 65 will be described hereinafter in greater detail.

Figure 2:
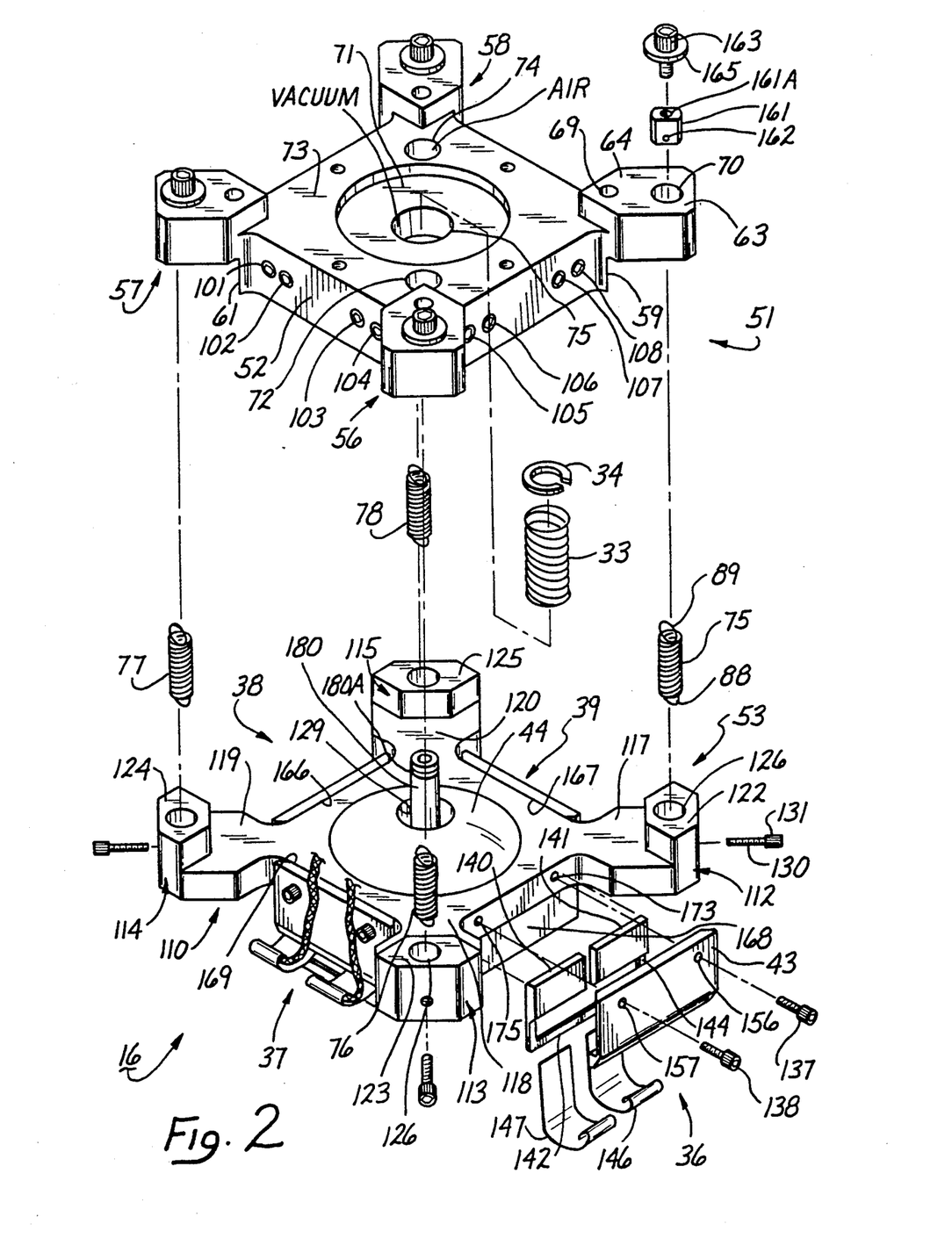
FIG. 2 is an exploded pictorial view of the hot bar reflow soldering head of FIG. 1.

Considering now the arm 55 in greater detail, as best seen in FIG. 2, the arm 55 includes a generally rectangularly shaped spring mounting member 63 integrally connected to a generally triangularly shaped tool adaptor mounting member 64. The tool adaptor mounting member 64 is integrally connected to the body portion 52 at its corner 59. A threaded aperture 69 is centrally disposed in the upper surface of member 64 and extends perpendicularly downwardly into the body portion 52. The aperture 69 is dimensioned to receive a threaded mounting bolt (not shown) for securing the upper head section 51 to the robotic tool adaptor 20. A bore 70 is centrally disposed in the top surface of member 63 adjacent to the distal end of the arm 55. The bore 70 is dimensioned to receive one of the spring assemblies, such as the assembly 65.

Figure 4:
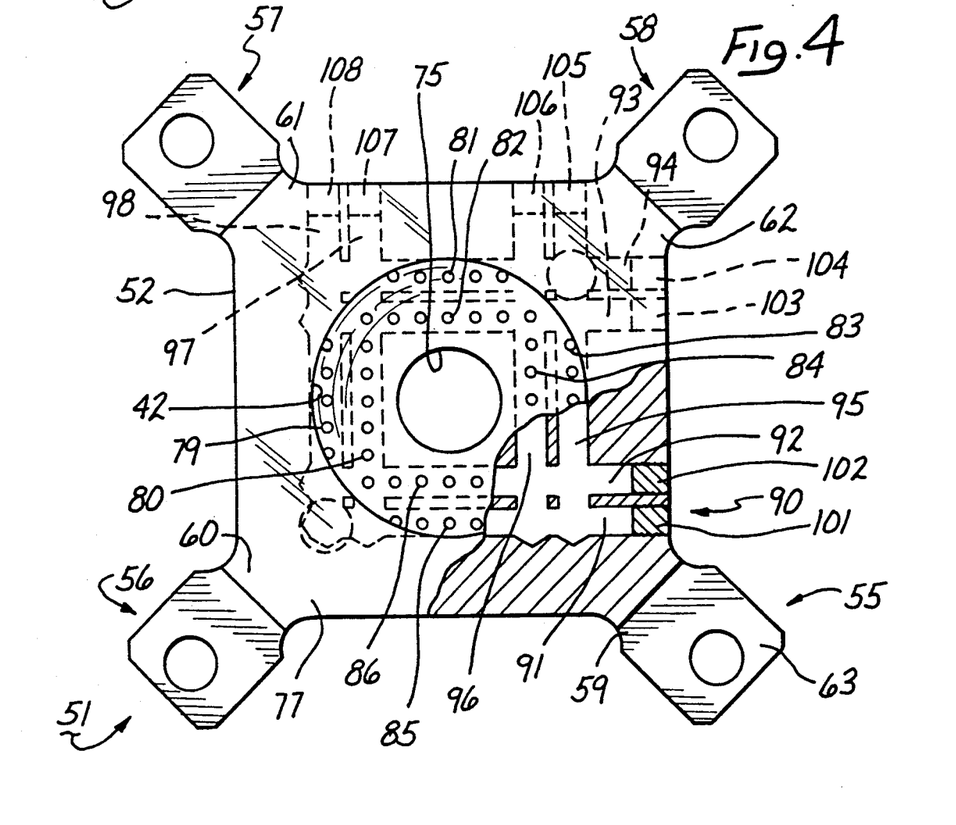
FIG. 4 is a diagrammatic, partly cut away view of the upper portion of the hot bar reflow soldering head of FIG. 2.

Considering now the body portion 52 of the upper head section 51 in greater detail with reference to FIGS. 2 and 4, the body portion 52 includes a large centrally disposed annular recess 71 in its upper surface 73 with a centrally disposed annular bore 75 therein for receiving a portion of the holding unit 30. As best seen in FIG. 4, the socket 42 is centrally disposed in the lower surface 77 of the body portion 52. Socket 42 includes a plurality of spaced apart socket outlets, such as outlets 79-86, equally distributed about the annular bore 75. Each of the plurality of spaced apart outlets, such as outlets 79-86 are in fluid communication with an air manifold, shown generally at 90, disposed within the upper head section 51. The air manifold 90 receives a supply of air under pressure from the robotic unit 18 so the air under pressure can be distributed to the socket outlets, such as the outlets 79-86. As the air under pressure exits the manifold 90 via the outlets 79-86 it forms an air cushion between the socket 42 and the protuberance 44. In this regard, the air cushion causes the protuberance 44 to float within the socket 42 for facilitating the movement of the lower head section 53 relative to the upper head section 51 by creating a low friction joint between their respective surfaces.

While in the preferred embodiment of the present invention the low friction joint between the socket 42 and the protuberance 44 is formed by an air cushion, it will be understood by those skilled in the art that other forms of low friction joints are contemplated within the scope of this invention, such as by coating the socket 42 and protuberance 44 with a teflon material.

As best seen in FIG. 4, the air manifold 90 generally includes four pairs of air passageways 91-98 for distributing air under pressure to the plurality of outlets, such as outlets 79-86. The first and second pairs of passageways 91, 92 and 93, 94 respectively, extend from one side of the body portion 52 through the third pair of passageways 95 and 96 and terminate in the fourth pair of passageways 97 and 98. Similarly, the third and fourth pairs of passageways 95, 96 and 97, 98 respectively, extend from another side of the body portion 52 through the second pair of passageways 93 and 94 and terminate in the first pair of passageway 91 and 92. Each of the passageways 91-98 are sealed at one end by a plug 101-108 respectively.

For the purpose of permitting air under pressure to be received within the air manifold 90, the body portion 52 also includes a pair of annular spaced apart fluid inlets 72 and 74 extending perpendicularly downwardly from the upper surface 73 terminating at the intersection of passageways 94, 96 and 91, 98 respectively. Each fluid inlet, such as inlet 72, is dimensioned to receive in a friction tight fit a fluid connector such as connector 76. Each of the fluid connectors, such as the connector 76, is connected by means not shown to a supply of air under pressure supplied via the robotic unit 18.

Figure 2A:
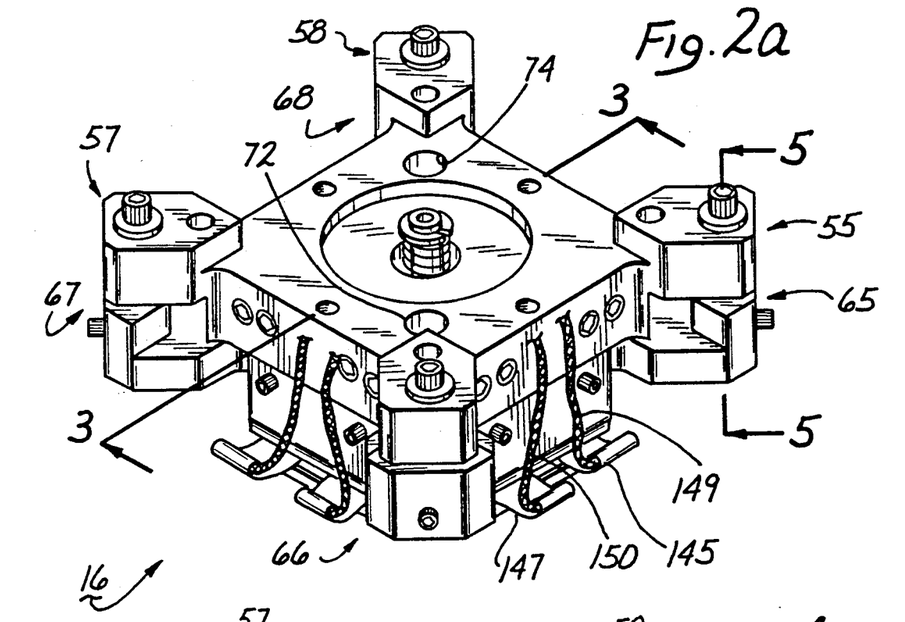
FIG. 2a is a pictorial view of the hot bar reflow soldering head of FIG. 1 in an assembled configuration.

Considering now the lower head section 53 in greater detail with reference to FIGS. 2 and 2a, the lower head section 53 generally has a unitary construction and is composed of a light weight metallic material such as aluminum for helping to minimize the load carried or supported by the robotic unit 18. As will be explained hereinafter in greater detail, the soldering unit 35 is adapted to be secured removably to the lower head section 53. The lower head section 53 includes a mounting block 110 and a set of four integrally connected outwardly projecting spring mounting arms 112-115. The arms 112-115 include a flat base member 117-120 respectively and a raised spring receiving member 122-125. As will be explained hereinafter in greater detail, each spring mounting arm 112-115 is adapted to receive and secure one of the springs 75-78 respectively. As each of the spring mounting arms 112-115 are substantially identical, only arm 112 will be described hereinafter in greater detail.

Figure 5:
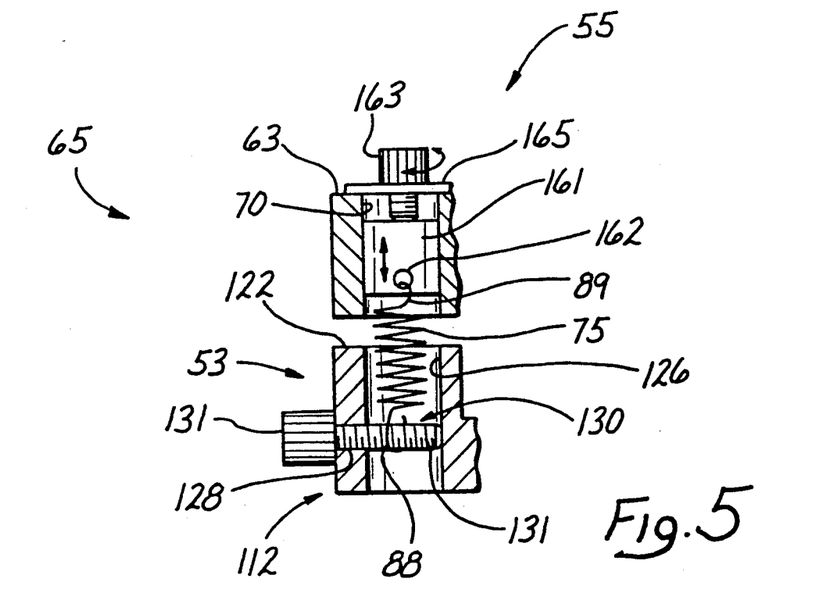
FIG. 5 is a greatly enlarged fragmentary partially diagrammatic longitudinal sectional view of a portion of the hot bar reflow soldering head of FIG. 2a taken substantially along line 5—5.

Considering now the spring assembly 65 in greater detail with reference to FIGS. 2, 2a and 5, for the purpose of securing the spring 75 to the upper head section 51, the spring assembly 65 includes a generally cylindrical shaped mounting member 161 which is dimensioned to be received within the hole in arm 56. The mounting member 161 has a centrally disposed threaded hole 161A in it upper surface that is adapted to receive a securing bolt 163 and with an integrally connected washer 165. A transverse hole 162 disposed in the lower portion of the member 161 and is adapted to receive and secure an end loop 89 of the spring 75. As best seen in FIGS. 2 and 5, as the bolt 163 is rotated into the mounting member hole 161A, the mounting member 161 moves within the arm 56 for adjusting the tension on the spring 76.

As best seen in FIGS. 2 and 5, the spring receiving member 122 of the arm 112 includes a centrally disposed bore 126 that is dimensioned to receive therein one of the springs, such as the spring 75. Member 122 also includes a traverse threaded cross bore 128 (FIG. 5) which terminates in the bore 126 and is dimensioned to threadably receive a spring securing bolt 130. Bolt 130 includes a head 131 and threaded shaft 132. The shaft 132 is dimensioned to pass through a loop 88 integrally formed on one terminal end of the spring 75. In this regard, the bolt 130 is utilized to secure one end of the spring 75 within bore 126 of the arm 113.

Considering now the mounting block 110 in greater detail with reference to FIGS. 1, 2a and 3, the mounting block 110 generally includes a lower section 111 having a centrally disposed opening 116 for receiving the holding unit 30 therein and an integrally connected upper flange section 121 for facilitating the mounting of the soldering unit 35 to the lower head section 53. The opening 116 is annular in shape having a centrally disposed recess 127 for facilitating the mounting of the holding unit 30 within the opening 116. A bore 139 is centrally disposed in the recess 127, and has a set of threaded mounting holes disposed around its periphery, such as the mounting holes 133 and 136. The holes 133 and 136 are adapted to receive a set of mounting bolts (not shown) securing the holding unit plate 30A within the recess 127. The bore 139 is generally annular and has a small annular opening 145 extending into a large annular hole 129 extending perpendicularly upwardly and terminating at the upper surface of the protuberance 44. The bore 139 is dimensioned to receive a air seal, such as a seal 139A. the air seal 139A is held in place by the plate 30A.

The flange section 121 has a rectangular box like configuration with a set of sidewalls 166-169, where each adjacent sidewall is interconnected by one of the integrally connected outwardly projecting spring mounting arms 112-115. Each sidewall, such as sidewall 168, includes a pair of parallel spaced apart mounting holes, such as the holes 173 and 175, for facilitating the mounting of the soldering unit 35 to the lower head section 53 as will be explained hereinafter in greater detail. Each sidewall and the corresponding adjacent portion of the lower section 111 defines a receiving area to accommodate a portion of the soldering unit 35 for mounting purposes.

In order to permit the holding unit 30 to be mounted securely to the lower head section 53 and to permit the lower head section 53 to pivot rockably relative to the upper head section 51, the opening 145 is dimensioned to receive the holding unit 30 in a loose fit, while the hole 129 is sufficient large is prevent the holding unit 30 disposed therein from preventing the rotation of the lower head section 53 relative to the upper head section 51.

Considering now the holding unit 30 in greater detail with reference to FIGS. 1 and 3, the holding unit 30 generally includes a support section 31 and a vacuum activated center quill section 32. The support section 31 includes an elongated upper tube portion 180 integrally connected to a lower portion 181. A annular groove 181A disposed in the lower portion 181 is adapted to receive an air seal, such as a air seal 180B. The air seal 180B is mounted to the lower section 111 and forms an air tight chamber C. The elongated upper tube section 180 is dimensioned to be snugly received within the small annular opening 145 and into the large annular hole 129. The tube portion 180 is of sufficient length to extend upwardly beyond the upper surface of the body section 110 and includes a groove 180A at its upper end to facilitate securing the holding unit 30 as will be explained hereinafter in greater detail.

For the purpose of supporting the upper tube portion 180 in the hole 129, a compression spring 33 surrounds the upper tube portion 180 and extends between the base of opening 129 to slightly above the top surface of the body section 110. A retaining clip 34 secures the spring 33 in the opening 129 and also secures the holding unit 30 in the hold 129.

As best seen in FIG. 3, the center quill 32 includes a hollow elongated cylindrical section 182 integrally connected to a generally annularly shaped base section 183 having a plurality of passageways in fluid communication with pneumatic vacuum pressure supplied through the robotic unit 18 as will be explained hereinafter in greater detail.

The base section 183 is a composed of a light weight material, such as aluminum or plastic. Certain ones of the passageways extending perpendicularly downwardly terminate in a set of openings such as the openings 185 and 186 for engaging an electronic device, such as the device 12. In this regard, when the undersurface of the base section 183 is adjacent to and resting against the device 12, the vacuum delivered through the openings 183 and 186 is sufficient to hold the device 12 in a firm stationary manner. Passageways terminating at other outer surface areas of the base section 183 are plugged with a set of plugs, such as the plug 189, to help facilitate directing the vacuum pressure in a generally longitudinal direction.

Considering now the soldering unit 35 in greater detail with reference to FIGS. 1, 2 and 2a, the soldering unit 35 generally comprises a set of four thermode units, shown generally at 36, 37, 38 and 39. The thermode units 36-39 apply heat to the leads 13 of the circuit device 12 and the pads 15 of the printed circuit board 14, respectively, for causing solder predeposited on the pads to reflow. As all of thermode units 36-39 are substantially identical, only thermode unit 36 will be described hereinafter in greater detail.

As best seen in FIGS. 2 and 3, the thermode unit 36 generally includes a elongated thermode blade 142 for transferring thermal energy to liquify solder predeposited on the pads 15 of the printed circuit board 14. The thermode blade 142 is composed of a thermally conductive, electrically insulative material, such as a ceramic material, for electrically isolating the leads 13 of the circuit device 12 from the high current energy utilized to raise the thermode blade 142 to solder reflow temperatures. The thermode blade 142 is of unitary construction and includes a pair of equally dimensioned, spaced apart, generally rectangularly shaped electrical contacts 140 and 141 respectively, for passing electrical energy. The blade 142 is integrally connected to each of the electrical contacts 140 and 141 by a pair of integrally connected upright members 143 and 144 respectively.

The thermode unit 36 also includes a pair of thin flat electrical conductors 146 and 147 for helping to couple energy to the contacts 140 and 141. The conductors 146 and 147 are composed of an electrically conductive material, such as copper and are electrically coupled to a high current source (not shown) by a pair of insulated braided copper cables 149 and 150 respectively. The conductors 146 and 147 are substantially identical, so only conductor 146 will be described hereinafter in further detail.

Considering now the conductor 146 in greater detail with reference to FIGS. 2 and 3, the conductor 146 has a unitary construction and uniform cross-sectional area. It includes a generally flat, thin rectangular member 152 whose width is slightly less than the width of the contact 140, a thin flat elongated U-shaped member 153 and a short truncated cylindrical member 154. Member 154 is of sufficient width to receive within its open interior an end portion of one of the copper cables, such as cable 149. In this regard, the cable 149 is attached to the member 154 by any convenient means such as spot welding.

For the purpose of mounting the conductors 146 and 147 in intimate contact with the electrical contact 140 and 141 respectively, the thermode unit 36 also includes a mounting plate 43 for securing the thermode blade 41 to the lower head section 53 and for securing the conductors 146 and 149 to the face of the contacts 140 and 141 respectively. The mounting plate 43 is of unitary construction and is composed of an electrically insulative, thermally non-conductive material for insulating the conductors 147 and 149 from the lower head section 53 and to prevent electrical. The plate 43 includes a pair of spaced apart apertures 156 and 157 for receiving the bolts 137 and 138 therethrough. In this regard, when the plate 43 is mounted to the lower head section 53, it secures removably the blade 41, as well as the conductors 146 and 147, to the lower section 111 of the lower head section 53. As best seen in FIG. 3, the conductors, such as the conductor 146 is secured between the contact 141 and the plate 43.

Considering now the mounting plate 43 in greater detail with reference to FIG. 2 and 3 the mounting plate 43 has a generally a thin elongated rectangularly shaped configuration with a truncated lower portion. The ends of the plate 43 are also truncated for helping to facilitate the alignment of the conductors 146 and 147 with the contacts 141 and 140 respectively.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A soldering apparatus for use with a robotic unit, having a holding unit for circuit device placement purposes and a soldering unit for soldering the leads of a circuit device to the pads of a printed circuit board, comprising:

mounting means for securing the soldering unit to the robotic unit;

said soldering unit having at least one elongated hot bar for distributing heat to the pads of the printed circuit board with solder pre-deposited thereon;

spring means for suspending said soldering unit from the underside of said mounting means and for causing said soldering unit to be supported movably relative to said mounting means;

means defining a universal joint partially disposed in said mounting means and partially disposed in said soldering head for helping to facilitate the movement of said soldering unit relative to said mounting means;

said mounting means having air chamber means for receiving fluid under pressure, said air chamber means being in fluid communication with said means defining a universal joint for helping to facilitate the movement of said soldering unit without causing movement of the robotic unit.

2. A soldering apparatus according to claim 1 further comprising electric coupling means for establishing a high current electrical path to said hot bar for heating purposes.

3. A soldering apparatus according to claim 1 wherein said spring means includes a plurality of springs.

4. A soldering apparatus according to claim 1, wherein said means defining a universal joint is responsive to the fluid under pressure for causing the leads of the circuit device to maintain a substantially coplanar relationship with the pads of the printed circuit board as the solder on the pads liquifies and reflows.

5. A soldering apparatus according to claim 1 wherein said mounting means includes a centrally disposed truncated semi-spherical shaped socket having a plurality of apertures; said apertures being in fluid communication with said air chamber means.

6. A soldering apparatus according to claim 5 wherein the holding unit includes a vacuum activated holding unit includes a vacuum activated holding quill and wherein said socket includes a centrally disposed hole, said hole being dimensioned to receive the vacuum activated holding quill.

7. A soldering apparatus according to claim 6 wherein said quill is movable in a rectilinear path directed through said universal joint without substantially hindering its movement.

8. A soldering apparatus according to claim 7 wherein said quill is connected to an activated piston for causing said quill to be moved for pick and place purposes.

9. A soldering apparatus according to claim 5 wherein said soldering head includes a centrally disposed truncated semi-spherical shaped protrusion.

10. A soldering apparatus according to claim 9 wherein said protrusion is dimensioned to be received in mating engagement within said semi-spherical shaped socket.

11. A soldering apparatus according to claim 10 wherein said means defining said universal joint includes said centrally disposed semi-spherical shaped socket and said semi-spherical shaped protrusion.

12. A soldering apparatus according to claim 10 wherein said protrusion is dimensioned to permit uniform movement of said elongated hot bar along its entire longitudinal axis.

13. A soldering apparatus according to claim 3 wherein said mounting means is generally rectangularly shaped and includes a set of four protrusions, each one of said protrusions being disposed at a corner portion of said mounting means and extending outwardly therefrom at an angle of about forty-five degrees.

14. A soldering apparatus according to claim 13 wherein said soldering head is generally rectangularly shaped and includes a set of four protrusions, each one of said protrusions being disposed at a corner portion of said soldering head and extending outwardly therefrom at an angle of about forty-five degrees.

15. A soldering apparatus according to claim 14 wherein each one of said protrusions includes a hole and means for securing removably a spring therein, each of said holes being dimensioned to receive one of said springs.

* * * * *